United States Patent
Sokolov

(10) Patent No.: US 10,938,316 B2
(45) Date of Patent: Mar. 2, 2021

(54) LED LIGHT SOURCE POWERED BY AN UNSTABLE THREE-PHASE AC NETWORK

(71) Applicant: Yuriy Borisovich Sokolov, Fryazino (RU)

(72) Inventor: Yuriy Borisovich Sokolov, Fryazino (RU)

( * ) Notice: Subject to any disclaimer, the term of this patent is extended or adjusted under 35 U.S.C. 154(b) by 0 days.

(21) Appl. No.: 16/302,595

(22) PCT Filed: May 25, 2017

(86) PCT No.: PCT/RU2017/000353
§ 371 (c)(1),
(2) Date: Nov. 16, 2018

(87) PCT Pub. No.: WO2017/200424
PCT Pub. Date: Nov. 23, 2017

(65) Prior Publication Data
US 2019/0319547 A1      Oct. 17, 2019

(30) Foreign Application Priority Data

May 17, 2016   (RU) ............................ RU2016119015

(51) Int. Cl.
*H05B 45/37* (2020.01)
*H02M 1/42* (2007.01)
(Continued)

(52) U.S. Cl.
CPC ....... *H02M 7/2173* (2013.01); *H02M 1/4208* (2013.01); *H02M 7/219* (2013.01); *H05B 45/37* (2020.01)

(58) Field of Classification Search
CPC ........ H05B 45/30; H05B 45/37; H05B 45/54; H02M 1/12; H02M 7/2173; H02M 1/4208
See application file for complete search history.

(56) References Cited

U.S. PATENT DOCUMENTS

| | | | | |
|---|---|---|---|---|
| 6,219,263 B1 * | 4/2001 | Wuidart | ............ | H02M 1/4266 363/125 |
| 7,276,861 B1 * | 10/2007 | Shteynberg | ............ | H05B 45/20 315/291 |

(Continued)

FOREIGN PATENT DOCUMENTS

| CN | 201014370 Y | 1/2008 |
|---|---|---|
| CN | 203068326 U | 7/2013 |

(Continued)

OTHER PUBLICATIONS

A. Nikitin "Application of Impulse Up Converters of National Semiconductor Company for LEDs Control," Components and Technologies, N28, 2007.

(Continued)

*Primary Examiner* — Jason Crawford
(74) *Attorney, Agent, or Firm* — Bryant J. Keller; Kirton McConkie

(57) ABSTRACT

An LED light source powered by an unstable three-phase AC network is described and relates to lighting technology and is intended for use in LED lighting devices which run on unstable three-phase AC networks. The technical and economic results of the claimed invention are a significant reduction in the cost, an increase in the reliability and a reduction in the weight and dimensions of LED lighting drivers, as well as an increase in the efficiency thereof. An LED-based light source includes a three-phase voltage rectifier (a first voltage source), a second adaptive voltage source, a voltage sensor of the first voltage source, and a group of series-connected LEDs with a passive current source, the first and second voltage sources being matched and connected in series, and the group of LEDs, connected in series with a passive current source, being connected into their combined voltage, wherein the voltage of the adaptive (second) voltage source is controlled by the voltage sensor (Continued)

of the first voltage source such that the combined voltage of the two voltage sources is always constant and depends on the range of instability of an AC network and the voltage at the adaptive voltage source.

20 Claims, 3 Drawing Sheets

(51) Int. Cl.
  *H02M 7/217* (2006.01)
  *H02M 7/219* (2006.01)

(56) References Cited

U.S. PATENT DOCUMENTS

| | | | | |
|---|---|---|---|---|
| 7,534,002 | B2 | 5/2009 | Yamaguchi et al. | |
| 8,081,146 | B2* | 12/2011 | Wang | H05B 45/20 |
| | | | | 345/82 |
| 8,487,546 | B2* | 7/2013 | Melanson | H05B 45/20 |
| | | | | 315/291 |
| 8,922,129 | B1* | 12/2014 | Rodriguez | H05B 45/37 |
| | | | | 315/224 |
| 2008/0202312 | A1* | 8/2008 | Zane | H05B 45/37 |
| | | | | 84/297 R |
| 2008/0303972 | A1 | 12/2008 | Han et al. | |
| 2011/0068700 | A1* | 3/2011 | Fan | H05B 45/44 |
| | | | | 315/185 R |
| 2011/0134639 | A1 | 6/2011 | Chung et al. | |
| 2012/0099317 | A1 | 4/2012 | Liu | |
| 2013/0082611 | A1* | 4/2013 | Cohen | H05B 45/44 |
| | | | | 315/185 R |
| 2013/0181626 | A1* | 7/2013 | Chen | H05B 45/00 |
| | | | | 315/200 R |
| 2013/0215606 | A1 | 8/2013 | Wang et al. | |
| 2014/0062333 | A1* | 3/2014 | Sonobe | H05B 45/10 |
| | | | | 315/291 |
| 2014/0091723 | A1* | 4/2014 | Kuo | H05B 45/14 |
| | | | | 315/200 R |
| 2014/0159601 | A1* | 6/2014 | Kato | H05B 45/37 |
| | | | | 315/200 R |
| 2014/0159604 | A1* | 6/2014 | Kato | H05B 45/37 |
| | | | | 315/200 R |
| 2014/0361623 | A1* | 12/2014 | Siessegger | H05B 45/00 |
| | | | | 307/64 |
| 2015/0256100 | A1* | 9/2015 | De Vaal | H05B 45/37 |
| | | | | 315/201 |
| 2016/0174318 | A1* | 6/2016 | Mignano | H05B 45/10 |
| | | | | 315/201 |
| 2016/0242248 | A1* | 8/2016 | Leskinen | H02M 7/219 |
| 2016/0262228 | A1* | 9/2016 | Huang | H02M 5/25 |
| 2016/0323947 | A1* | 11/2016 | Seki | H05B 45/10 |
| 2017/0055320 | A1* | 2/2017 | Somarowthu | H02M 1/4208 |
| 2019/0252967 | A1* | 8/2019 | Sokolov | H02M 1/12 |

FOREIGN PATENT DOCUMENTS

| | | |
|---|---|---|
| CN | 203477931 U | 3/2014 |
| CN | 203500894 U | 3/2014 |
| CN | 203731137 U | 7/2014 |
| DE | 20 2010 004 780 U1 | 10/2011 |
| GB | 2 348 272 A | 9/2000 |
| JP | 2008-091185 A | 4/2008 |
| JP | 2012-169293 A | 9/2012 |
| KR | 100457878 A | 11/2004 |
| KR | 20090019625 A | 2/2009 |
| KR | 101415690 B1 | 7/2014 |
| KR | 101430021 B1 | 8/2014 |
| KR | 101434508 | 8/2014 |
| RU | 2301475 C1 | 6/2007 |
| RU | 112 340 | 1/2012 |
| RU | 2452893 C1 | 6/2012 |
| RU | 118 398 U1 | 7/2012 |
| RU | 128 696 U1 | 5/2013 |
| RU | 147907 | 11/2014 |
| RU | 2552100 | 6/2015 |
| RU | 2592890 C1 | 7/2016 |
| RU | 168569 U1 | 2/2017 |
| SU | 629403 A1 | 10/1978 |
| SU | 1227910 A1 | 4/1986 |
| SU | 1265949 A1 | 10/1986 |
| SU | 1580508 A1 | 7/1990 |
| TW | 201329388 A | 7/2013 |
| TW | 201405067 A | 2/2014 |
| WO | 88/02460 A1 | 4/1988 |
| WO | 2013/063898 A1 | 5/2013 |
| WO | 2013/109161 A1 | 7/2013 |
| WO | 2014/166367 A1 | 10/2014 |
| WO | 2015/171014 A1 | 11/2015 |
| WO | 2016/161363 A1 | 10/2016 |

OTHER PUBLICATIONS

Lumen & Expertunion "Lumen," www.lumen2b.ru #01-02 (14-15), Oct. 2016.
Zumtobel company catalog, p. 36, http://zumtobel.com/com-en/products/lights_fields [online].
PowerBalance, www.lighting.philips.com/ru-ru/index.wpd, [online].

* cited by examiner

LED LIGHT SOURCE POWERED BY AN UNSTABLE THREE-PHASE AC NETWORK

FIELD

Some implementations relate to illuminating engineering and are intended for being used as a part of high-powered professional LED illuminators.

BACKGROUND

The general implementation of LED illumination systems is standard power supply with frequency transformation, producing constant current for LED powering, and voltage at the terminals of this power supply corresponds to the total voltage at LEDs and, as a rule, has a value from 12 to 120 V, in some cases higher voltage. At the same time, if high light intensity, used in professional equipment (powerful HighBay, tower cranes, high rooms, powerful projectors for wide area illumination (stadiums, airfields etc.) is necessary, such implementations are not reasonable, because low degree of reliability of power sources, connected with the presence of electrolytic capacitors, high price, big weight and dimensions restrain the development of LED illumination in many fields of activities (patent RU2452893, МПК F21S 8/00, published 10 Jun. 2012).

If power capacity is big and output voltage is low, necessary currents for high-power illuminators realization increase sharply, and high currents impede energy transfers to a distance, because wire losses increase. For example, when illuminating stadiums, projectors are usually located at considerable distance from power cabinets with power sources and are installed by climbers. As a rule, in such devices two wires with voltage, that exceeds 700 V, are set from the source to the projector, because the power of projectors is usually from 700 to 2000 W.

Besides this, direct voltage of high level (more than 700 . . . 800 V) is beginning to be used in innovative LED illumination nowadays (A. Nikitin "Application of impulse up converters of National Semiconductor company for LEDs control, "Components and technologies", N28 2007). In other words, for projecting of high power illumination, especially for devices, that are located in inaccessible places (towers, posts of external illumination, lamps of high industrial buildings, projectors, etc.), overvoltage and even power sources that are not isolated from commercial power supply are quite acceptable.

Technical and economic results of claimed invention are an increase of reliability, decrease of weight and dimensions of LED illuminator drivers, considerable decrease of cost and increase of their effectiveness 3 . . . 5% comparing to the best drivers, known nowadays.

DETAILED DESCRIPTION

The claimed invention may be characterized by the following combination of criteria:

Source of light on diodes, including a three-phase voltage rectifier—the first source of voltage, the second adaptive source of voltage, a voltage sensor of the first source of voltage, a group of sequentially connected LEDs with a source of current, characterized by the fact that the first and the second sources of voltage included with opposite polarity and in series, and their total voltage include a group of LEDs, sequentially connected with the current source, and voltage of the adaptive source of voltage is controlled by a voltage sensor of the first source of voltage in such a way that the total voltage of both sources of voltage is constant and depends on the range of instability of AC network and voltage on adaptive source of voltage.

The basis for high voltage drivers creation is a 6-diode three-phase AC network rectifier that gives nominally 540 . . . 560V (220 . . . 230V) of peak voltage with a ripple of about 5-6% without capacitors. But instability of commercial networks may be more than ±10%, and for that reason, it is necessary to take some measures to eliminate the effect of this factor to light characteristics of illuminator.

Figure 1:
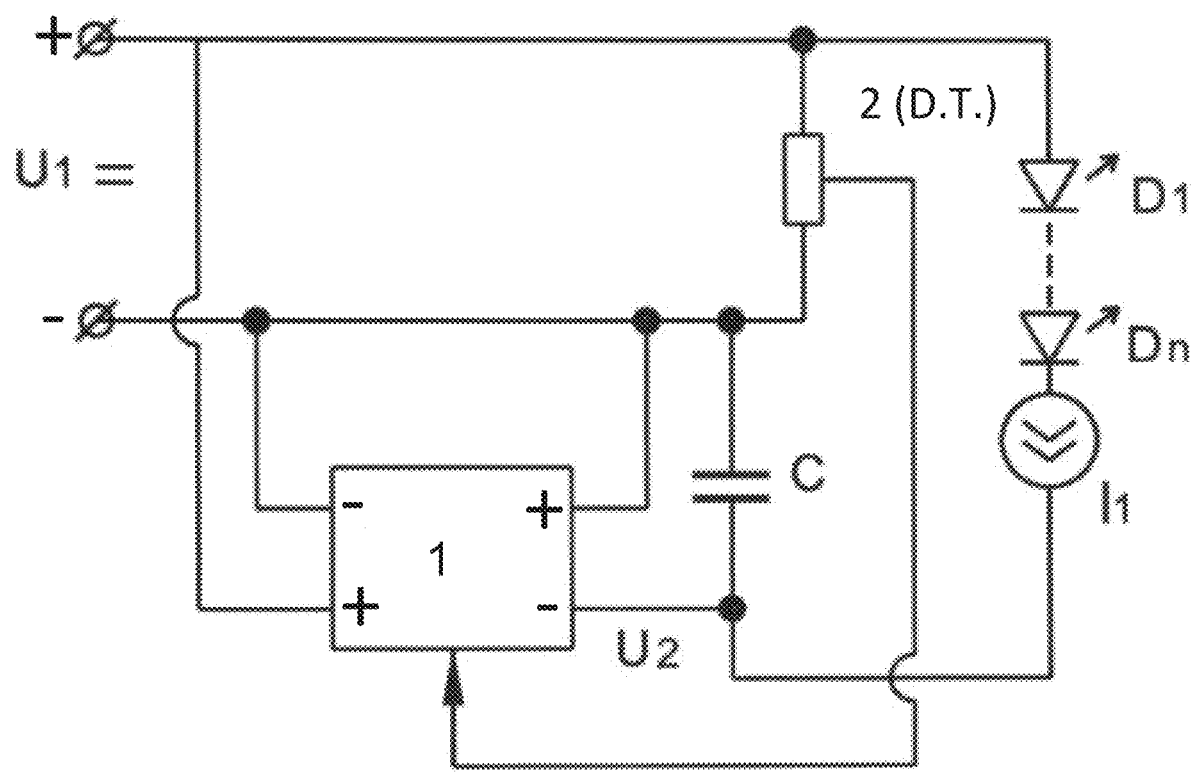
FIGS. 1-2 each illustrate an LED power circuit in accordance with a different representative embodiment.

FIG. 1 illustrates the LEDs power circuit from two sources of voltage with control from a voltage sensor, where:

U1—the first basic unstabilized source of voltage (it is three-phase network rectified voltage, when there is a three-phase network, with a range of voltage being from 486 to 594 V);

U2—direct voltage from adaptive source of voltage;

1—adaptive source of voltage;

2—D.T. voltage sensor of the first source of voltage, controlling the signal of adaptive source of voltage control;

C—adaptive source of voltage output capacitance;

D1 . . . Dn—LEDs; and

I1—current source.

The power sources are set sequentially and LEDs are set into their total voltage sequentially with the current source. Adaptive source of voltage control is carried out from sensor of voltage 2 (D.T.) with a three-phase network rectifier. The bigger voltage from the rectifier, the less voltage to the adaptive source of voltage and vice versa.

In case of ±10% network instability, voltage after the rectifier will be within the range of 485 . . . 595V. If we take the minimal voltage to the adaptive source of voltage, equal to 20 V, then the range of voltage, that goes to the power supply adaptive source of voltage, is: 595−485=110 V, i.e., from 20 to 130V, and the total voltage will always be equal to 615V. This voltage includes LEDs with current source I1. If current necessary for LEDs is accepted as equal to 0.7 A, then the driver total power is Ptot.=615×0.7=430.5 W. The power, taken from the first source of voltage 1 will be within the limits:

from 485V×0.7 A=339.5 W to 595V×0.7 A=416.5 W

Adaptive source of voltage power will be within the limits: from 20V×0.7 A=14 W, to 130V×0.7 A=91 W, i.e., the power of adaptive source of voltage is only 21% of the total power of the whole driver.

Figure 2:
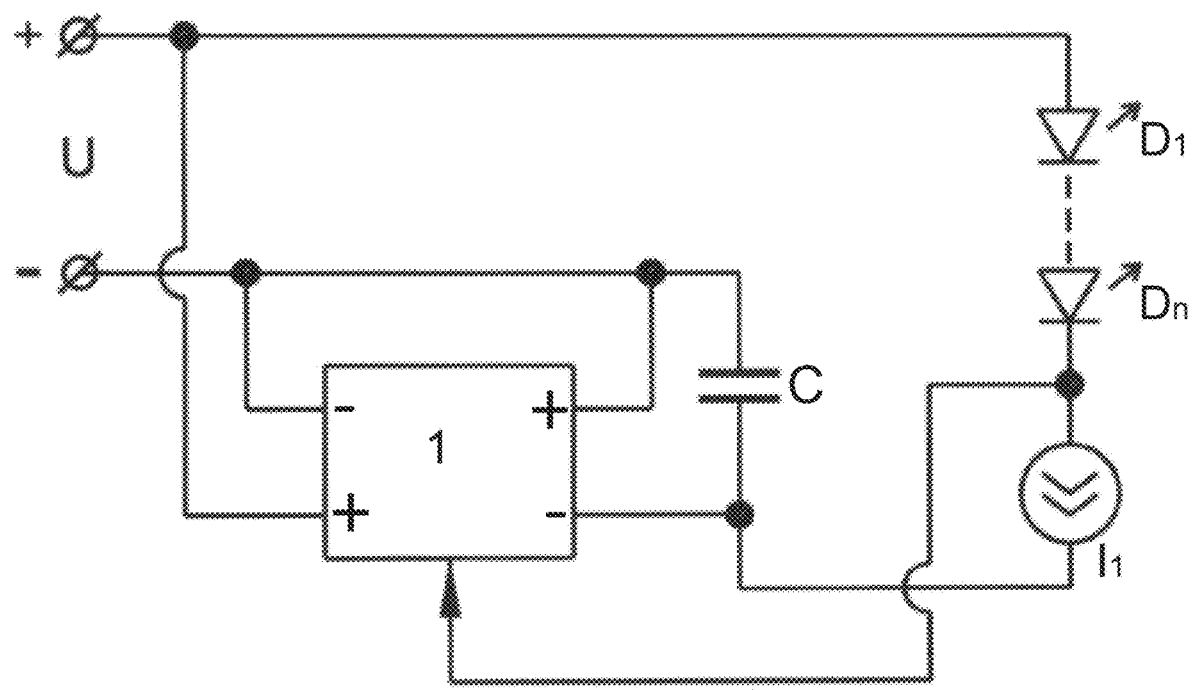

FIG. 2 illustrates similar driver scheme, but the feedback to adaptive source of voltage control is taken from the current source, and it has significant advantages comparing to the previous scheme. Minimal allowable voltage is kept at the current source, which allows reaching the maximum effectiveness (maximum coefficient of efficiency). At the same time, automatic dispersion of voltage compensation is reached at LEDs, which are inevitable even inside one batch and all the more, for LEDs from different batches.

Figure 3:
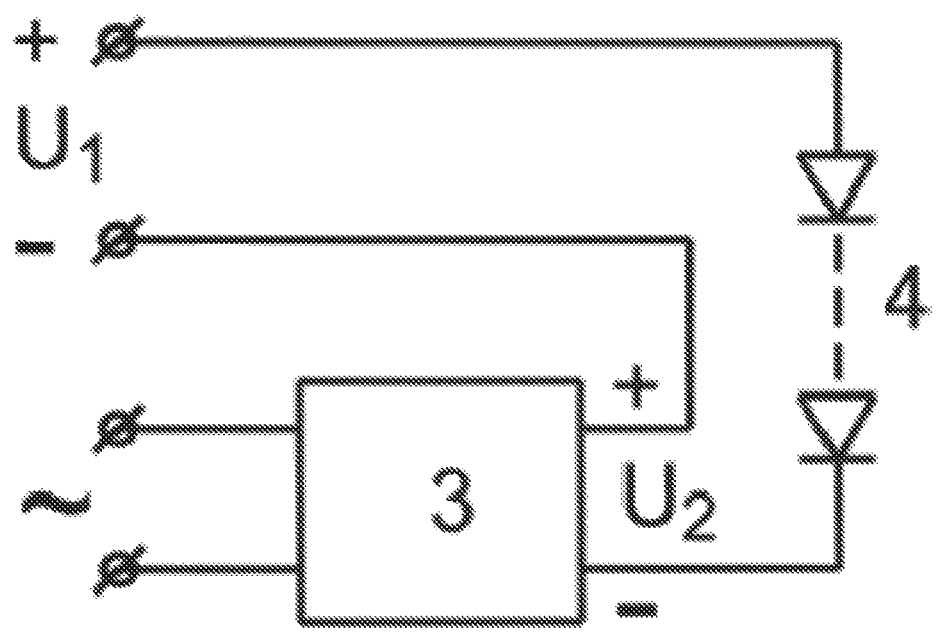
FIG. 3 illustrates a driver with an active current source in accordance with a representative embodiment.

FIG. 3 illustrates the scheme of a driver with an active current source, powered by single-phase AC network, where:

U1—rectified voltage of a three-phase network;
U2—voltage at output terminals of the active current source;
3—active current source, powered from a single-phase AC network; and
4—a group of LEDs.

A standard active current source, powered by a single-phase, three-phase network, or by three-phase network rectified voltage is used as an adaptive source of voltage. An active current source is a current source that has an independent power supply. If coefficient of efficiency of current source is I1=0.92 at power 91 W (the worst variant), then the total coefficient of efficiency of the driver is:

$$\eta_2 = \frac{430 - 91 \times 0.08}{430} = 0.983$$

In a nominal operating point (at nominal voltage) the current source power is 38.5 W and coefficient of efficiency is approximately 0.9, then coefficient of efficiency of the driver is:

$$\eta_{2HOM} = \frac{430 - 38.5 \times 0.01}{430} = 0.999(!)$$

The best indicators for a standard driver for 430 W may be about 0.95, i.e., advantage is more than 4.0%, non-metering dropping the power at the rectifier bridge. For the reason that LEDs are the load for a driver, and you may take it as an active load, the power factor will also be close to one (even if the power factor is PF=0.97 for a current source, in case of total power of 430 W, it will be close to one). Harmonic components will be defined only by the current source, which are lower than standard requirements at its nominal power of 38.5 W, and for the power of 430 W they will be insignificant. There is one more advantage of suggested schemes—it's not necessary to balance the phases, because the main power, consumed by the driver, is balanced automatically, and if powering of the current source is performed from rectified voltage of a three-phase network, then 100% balancing of load to phases is realized.

A light-emitting diode light source includes a three-phase rectifier, connected to an AC three-phase network, an auxiliary supply source, put sequentially with a three-phase rectifier voltage, and a group of sequentially connected LEDs is included into their total voltage. If an auxiliary supply source is a source of voltage, then it can be adaptive to voltage changing at the rectifier and a passive current source is included sequentially with LEDs. If an auxiliary source is an active current source itself, then an auxiliary current source is not installed.

What is claimed:

1. An LED light source for connection to an unstable AC network, the LED light source comprising:
   a positive input and a negative input that are each configured to electrically connect the LED light source to a rectified unstabilized source of voltage;
   a load circuit that includes multiple LEDs connected in series;
   an adaptive power supply that is connected to at least one of: (i) the positive input and the negative input that are configured to electrically connect the LED light source to the rectified unstabilized source of voltage and (ii) an external independent source of electrical energy; and
   a feedback circuit having an output that is connected to the adaptive power supply,
   wherein a positive output of the adaptive power supply is connected to the negative input,
   wherein a negative output of the adaptive power supply is connected to an output of the load circuit, and
   wherein the positive input is connected to an input of the load circuit.

2. The LED light source of claim 1, wherein an input of the feedback circuit is connected to the positive input.

3. The LED light source of claim 1, wherein an input of the feedback circuit is connected to the output of the load circuit.

4. The LED light source of claim 1, wherein the adaptive power supply is configured to provide a different amount of voltage to the load circuit than does the rectified unstabilized source of voltage, and wherein the feedback circuit is configured to vary an output voltage of the adaptive power supply that is supplied to the load circuit based on feedback from the feedback circuit relating to an output voltage of the rectified unstabilized source of voltage.

5. The LED light source of claim 1, wherein the feedback circuit is configured to cause the adaptive power supply to reduce an output voltage the adaptive power supply provides to the load circuit when the rectified unstabilized source of voltage provides a high voltage, and wherein the feedback circuit is configured to cause the adaptive power supply to increase the voltage the adaptive power supply provides to the load when the rectified unstabilized source of voltage provides a low voltage.

6. The LED light source of claim 1, wherein the feedback circuit and the adaptive power supply are configured to keep substantially constant a total voltage of: (i) the voltage output of the rectified unstabilized source of voltage that is supplied to the LED light source and (ii) the voltage output of the adaptive power supply.

7. The LED light source of claim 1, wherein a voltage output of the adaptive power supply is lower than a voltage output of the rectified unstabilized source of voltage.

8. The LED light source of claim 1, wherein a voltage output of the adaptive power supply is different than a voltage output of the rectified unstabilized source of voltage, and wherein a voltage that is provided to the load circuit is equal to a sum of the voltage output of the rectified unstabilized source of voltage and the voltage output of the adaptive power supply.

9. The LED light source of claim 1, wherein the LED light source further comprises a capacitor that is disposed between, and that electrically couples to, both the negative output of the adaptive power supply and the negative input.

10. An LED light source for connection to an unstable AC network, the LED light source comprising:
    a positive input and a negative input that are each configured to electrically connect the LED light source to a rectified unstabilized source of voltage;
    a load circuit that includes multiple LEDs connected in series;
    an adaptive power supply that is connected to at least one of: (i) the positive input and the negative input that are configured to electrically connect the LED light source to the rectified unstabilized source of voltage and (ii) an external independent source of electrical energy; and
    a feedback circuit having an output that is connected to the adaptive power supply, wherein a positive output of the adaptive power supply is connected to the negative input, wherein a negative output of the adaptive power supply is connected to an output of the load circuit, wherein the positive input is connected to an input of the load circuit, and wherein the adaptive power supply is configured to vary its voltage output based on output from the feedback circuit to compensate for variations in a voltage output of the rectified unstabilized source of voltage.

11. The LED light source of claim 10, wherein the adaptive power supply comprises a current source.

12. The LED light source of claim 10, wherein an input of the feedback circuit is connected to the positive input.

13. The LED light source of claim 12, wherein the LED light source further comprises a capacitor that is disposed between, and that electrically couples to, both the negative output of the adaptive power supply and the negative input.

14. The LED light source of claim 13, further comprising a current source that is electrically coupled to an output of the multiple LEDs connected in series.

15. The LED light source of claim 10, wherein an input of the feedback circuit is connected to the output of the load circuit.

16. The LED light source of claim 10, wherein the voltage output of the adaptive power supply is different than the voltage output of the rectified unstabilized source of voltage, and wherein a voltage that is provided to the load circuit is equal to a sum of the voltage output of the rectified unstabilized source of voltage and the voltage output of the adaptive power supply.

17. The LED light source of claim 10, wherein the voltage output of the adaptive power supply is different than the voltage output of the rectified unstabilized source of voltage, and wherein the adaptive power supply is configured to keep substantially constant a total voltage of: (i) the voltage output of the rectified unstabilized source of voltage that is supplied to the LED light source and (ii) the voltage output of the adaptive power supply.

18. The LED light source of claim 10, wherein the LED light source further comprises a capacitor that is disposed between, and that electrically couples to, both the negative output of the adaptive power supply and the negative input.

19. The LED light source of claim 10, further comprising a current source that is electrically coupled to an output of the multiple LEDs connected in series.

20. The LED light source of claim 10, wherein the feedback circuit is configured to cause the adaptive power supply to reduce an output voltage the adaptive power supply provides to the load circuit when the rectified unstabilized source of voltage provides a high voltage, and wherein the feedback circuit is configured to cause the adaptive power supply to increase the voltage the adaptive power supply provides to the load when the rectified unstabilized source of voltage provides a low voltage.

* * * * *